United States Patent [19]

Cornelius et al.

[11] 4,392,953

[45] Jul. 12, 1983

[54] AQUARIUM FILTRATION APPARATUS

[75] Inventors: Douglas P. Cornelius, Brooklyn Park; Charles G. Erickson, Anoka, both of Minn.

[73] Assignee: Cornelius Products Inc., Brooklyn Center, Minn.

[21] Appl. No.: 238,072

[22] Filed: Feb. 25, 1981

[51] Int. Cl.³ .................. E04H 3/20; B01D 35/02
[52] U.S. Cl. .................. 210/169; 210/416.2; 210/445; 210/453
[58] Field of Search .............. 210/169, 416, 445, 446, 210/451, 453; 119/3, 5

[56] References Cited

U.S. PATENT DOCUMENTS

| | | | |
|---|---|---|---|
| 2,295,982 | 9/1942 | Widman | 210/169 X |
| 2,515,538 | 7/1950 | Well | 210/169 |
| 2,533,936 | 12/1950 | Holmes et al. | 210/169 |
| 3,145,168 | 8/1964 | Scafuro | 210/169 |
| 3,149,608 | 9/1964 | Murphy | 210/169 |
| 3,158,104 | 11/1964 | Hutchinson | 210/169 X |
| 3,225,930 | 12/1965 | Willinger | 210/241 |
| 3,302,789 | 2/1967 | Holt | 210/169 X |
| 3,348,686 | 10/1967 | Spitzer | 210/169 |
| 3,458,441 | 7/1969 | Dockery et al. | 210/416 |
| 3,487,440 | 12/1969 | Newsteader | 210/169 |
| 3,513,078 | 5/1970 | Newsteder | 210/169 |
| 3,635,344 | 1/1972 | Louiz | 210/169 |
| 3,686,835 | 8/1972 | Strange et al. | 210/445 X |
| 3,734,853 | 5/1973 | Horvath | 210/169 |
| 3,815,547 | 6/1974 | Willyer et al. | 210/169 |
| 3,826,371 | 7/1974 | Adamson | 210/169 |
| 3,891,555 | 6/1975 | Bennett et al. | 210/169 |
| 4,002,566 | 1/1977 | Smith | 210/169 |
| 4,036,756 | 7/1977 | Doeley | 210/169 |
| 4,265,751 | 5/1981 | Willyer | 210/169 |
| 4,285,813 | 8/1981 | Stewart et al. | 210/169 |

FOREIGN PATENT DOCUMENTS 2754110 6/1977 Fed. Rep. of Germany .......... 119/5

OTHER PUBLICATIONS

Catalog pages picked up at trade show in Chicago in 1978, not otherwise identifiable.

Primary Examiner—Robert H. Spitzer
Attorney, Agent, or Firm—Hill, Van Santen, Steadman, Chiara & Simpson

[57] ABSTRACT

A power driven cleaning device for an aquarium includes filter suspended in the aquarium tank and through which water is circulated by an impeller. A first filter pad is followed by a filter cartridge, each of which spans the flow path, and which are clamped in place by a removable cover, for service.

1 Claim, 4 Drawing Figures

AQUARIUM FILTRATION APPARATUS

BACKGROUND OF THE INVENTION

1. Field of the Invention

This invention relates to a power driven cleaning device of a portable type for cleaning aquarium tanks.

2. Prior Art

The public has long experienced considerable amount of difficulty in cleaning aquarium tanks. Types of difficulty encountered have been lack of convenience, too much time needed to clean an aquarium tank, not all water handled being cleaned, lack of removal of relatively small particles, inadequate type of cleaning, not all parts of the tank suitably cleaned, lack of facility by which a cleaning device is itself cleaned, and excessive cost of manufacture and use.

SUMMARY OF THE INVENTION

The present invention is directed to a power driven cleaning device for an aquarium tank which includes a body to be suspended in the tank and having a filter housing portion receptive of filter media, and a removable cover for fixedly holding the filter media in place, there being means on the cover and the body to define a flow passage leading from a water inlet through the filter media to an impeller, to a water outlet, the flow passage being entirely below the surface of the water. With this arrangement, many of the components can be made of molded material and unified to provide a light weight device that is readily portable and which is convenient to operate, and which is rapid to use so that continuous operation is not necessary. In a preferred embodiment, there is both mechanical filtering by use of a cellulose pad and a chemical filtering by use of diatomaceous earth and activated charcoal. The device can be disassembled for cleaning the filter media or replacing them in just a few seconds without use of any tool.

Accordingly, it is an object of the present invention to provide a cleaning device for an aquarium tank which overcomes or offsets the disadvantages enumerated above under "Prior Art".

Another object of the invention is to provide an aquarium filter that will function to remove materials larger than one micron.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 3:
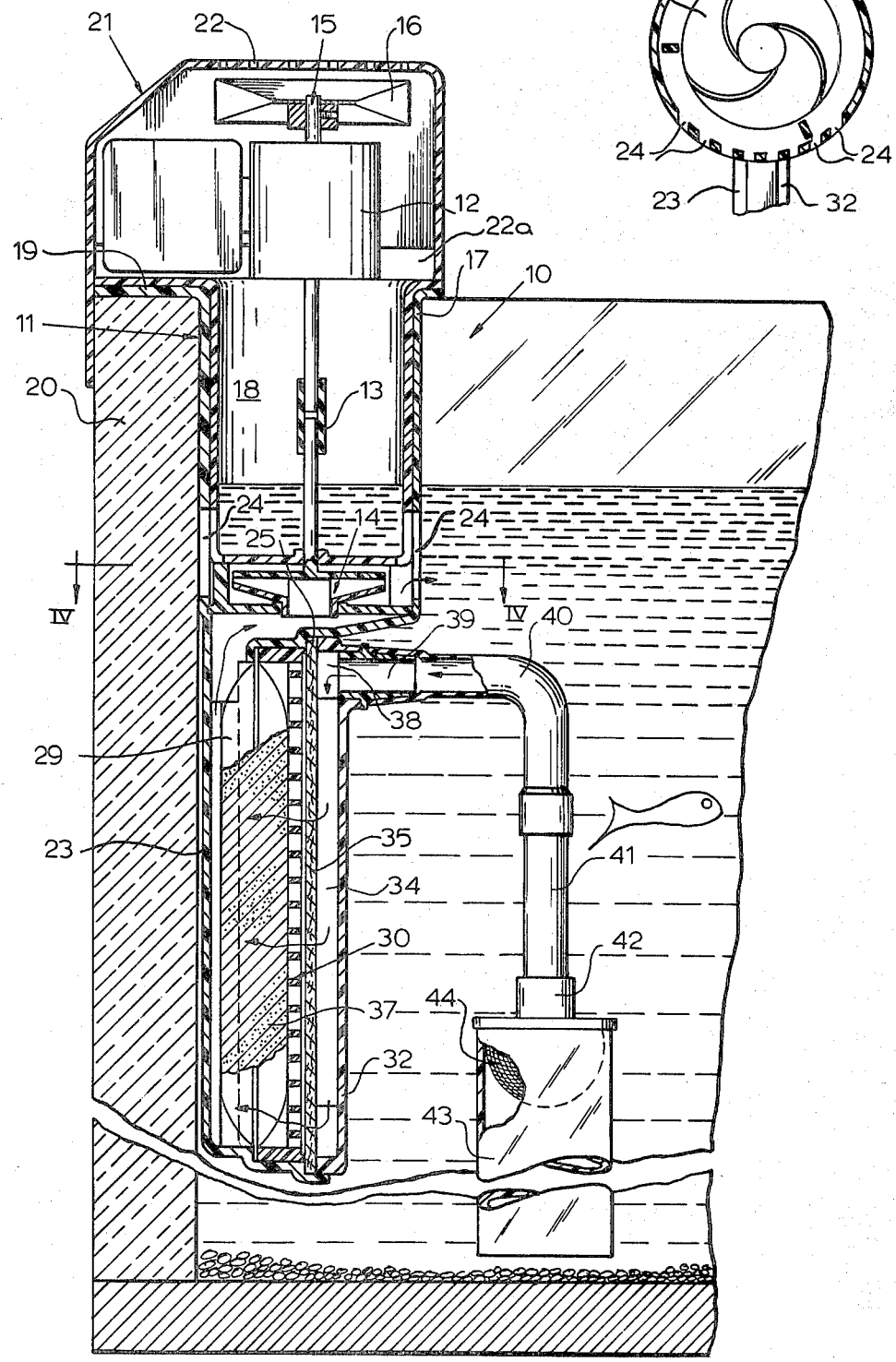
FIG. 3 is a vertical cross-sectional view taken along line III—III of FIG. 1.
Figure 4:
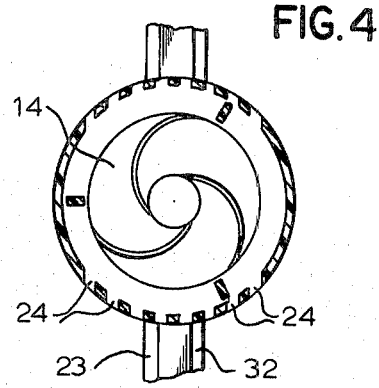
FIG. 4 is a cross-sectional view taken generally along line IV—IV of FIG. 3.

A power driven cleaning device according to the invention is shown in the fullest detail in FIG. 3, generally indicated by the numeral 10. The device includes a body 11 molded of styrene on which there is supported a motor 12 having a drive connection 13 with an impeller 14, the motor 12 having a second output shaft having a drive connection 15 with a fan blade 16. The body 11 has an impeller housing portion 17 within which there is a cup-like member 18 which provides the direct support for the motor 12 and the bearing support for the impeller 14. The body 11 has a support flange 19 shown as resting on the rim of a tank 20 with the motor 12 disposed entirely above the tank and hence above the water level. The motor 12 and the upper end of the body 11 are enclosed by a shroud 21 having an apertured region 22 disposed in registration with the fan blade 16.

The impeller housing portion 17 is partly disposed in the water and is thus suspended from the rim of the tank. The impeller housing portion 17 is integral with and suspends a filter housing portion 23 of the body 11. The cup-like member 18 and the impeller housing portion 17 have a series of elongated submersed apertures 24 which are in registration with the impeller 14 and the lower part of the cup-like member 18 so that there is no path by which the impeller 14 may draw air through the elongated discharge apertures 24. The apertures 24 thus provide a water outlet for the impeller 14, and seal it from air. As shown, the water level is maintained so as to completely close the upper end of the apertures 24, thereby to prevent cavitation in the impeller. Discharge air from the fan blade 16 exits through a pair of lateral openings 22A.

The filter housing portion 23 is disposed entirely below the surface of the water and it receives the filter media.

Figure 1:
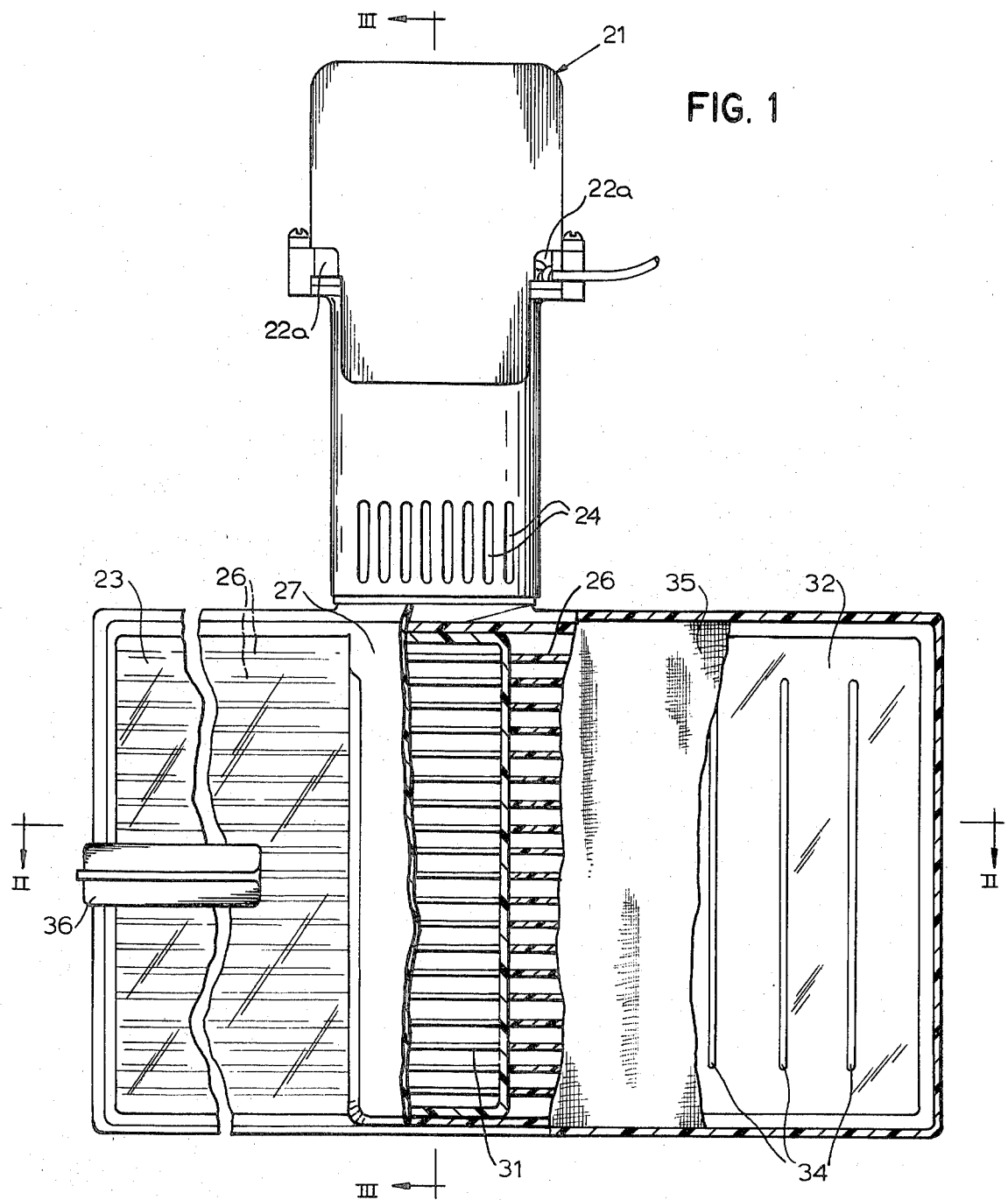
FIG. 1 is a rear elevational view, partly broken away and in cross-section, of a power cleaning device for an aquarium tank.
Figure 2:
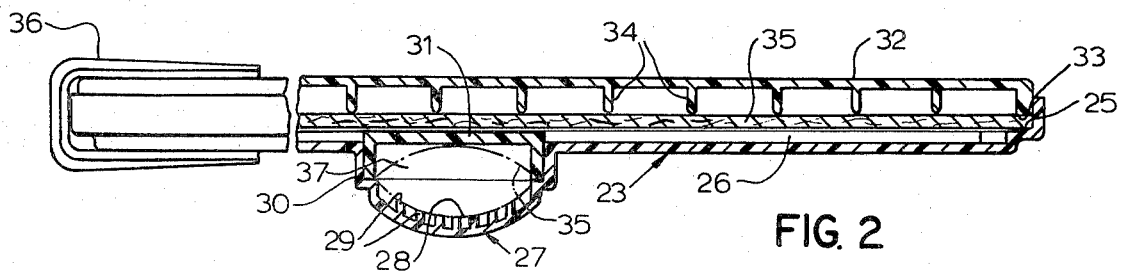
FIG. 2 is a horizontal cross-sectional view taken along line II—II of FIG. 1.

The filter housing portion 23 has a rectangular first nest 25, best understood from FIG. 2. For all but the central portion of the rectangular nest 25, there are a series of vertically spaced horizontal ribs 26 that project from the wall of the filter housing portion 23, such ribs being obscured from view in FIG. 3 but best seen in FIGS. 1 and 2. As best seen in FIG. 2, the wall has a semicircular bulge that runs vertically as shown at 27, thereby defining a second nest 28 which is provided with a series of vertical ribs 29. The first nest 25 is separated from the second nest 28 by a molded grille 30 which has vertical side portions that are spanned by a series of ribs 31 which are horizontal and which are vertically spaced from each other as best shown in FIG. 3.

The nest 25 is closed by a molded cover 32 which is removable and which is rectangular in shape, having a flat marginal portion 33 which is received in the nest 25. The cover 32 has a series of vertical ribs 34 which, along with the marginal edge 33 engages one side of a first filter media 35.

The filter media 35 is a flat sheet of cellulose fibers having diatomaceous earth therein so that this element can remove particles larger than one micron. The marginal portion 33 of the cover 32 thus acts on the periphery of the first filter media 35 to force the same against the nest 25 of the filter housing portion 23, thereby forming a peripheral seal that extends all the way around the margin of the filter media 35. These components are held in the relationship described by means of a series of four spring clips 36, one of which is shown. Advantageously, the spring clips can be made of a plastic supplied by Dupont under the trademark DELRIN. Other clamps may be used.

In the second nest 28, there is a second filter medium 37 which comprises a suitably treated porous paper that makes up a cartridge that is filled with an active filter material such as charcoal, the periphery being heat sealed to form a flange or gasket on which the periphery of the grille 31 acts as shown at the sides in FIG. 2 and at the upper and lower margins in FIG. 3.

The cover 32 has a water inlet 38 provided by an aperture therein into which there is fitted a hose fitting 39 onto which a hose or flexible conduit 40 is secured. At the other end of the flexible conduit there is a wand 41 which can be manipulated by hand and which through an adaptor 42 is connected to a sight tube 43. Within the sight tube there is a screen 44 which is intended to keep out items that should not go through the filter, such as small fish, fine gravel and the like. The sight tube comprises cellulose acetate butyrate as does the wand. The cover 32 is an acrylic. The wand 41 and sight tube 43 may be considered an accessory for reaching specific parts within the tank and other accessories may be substituted if desired.

The various components described thus provide a flow passage from the sight tube 43 through the water inlet 38 and from this point, the ribs 34 of the cover 32 serve as a water distribution means to spread incoming water across the entire relatively large surface of the filter 35. Because of the peripheral seal and as the filter 35 spans the entire flow passage, a suction builds up on the downstream side to aid the water in flowing therethrough. Wherever the water has passed through the filter 35, it then flows between the ribs 26 of the filter housing portion 23 as best shown in FIG. 2, toward the center and then between the vertically spaced horizontal bars 31 of the grille 30. As the second filter is also peripherally sealed, all the water must flow through that cartridge and be collected in the vertical spaces between the ribs 29. At this point, the only place for the filtered water to flow is upwardly as shown in FIG. 3 to the inlet of the impeller 14.

As all of the portions that provide the flow passage means are disposed below the water level in the tank, the device is self priming.

To place the device in service, it is merely necessary to hang the same on the edge of the tank, plug in the cord that leads to the electric motor, and then direct the wand 41 or the sight tube 43 to the area sought to be cleaned. As there is a sucking action, there is very little tendency to roil the gravel in the bottom of the tank, and yet the lower end can be used as a stirring device and dirt that is raised by that action is promptly drawn in to the sight tube 43.

In order to service the device, it is lifted out of the tank, the four spring clips 36 are slid off, thus releasing the cover 32. The rectangular filter 35 can now be lifted out, and then the grille 30 can be removed, thus exposing the cartridge filter 37. With the unit laying on its back, a new cartridge 37 can be placed in the lower nest, the grille 30 can be laid thereupon, then a replacement rectangular filter 35 can be placed in the first nest, and the cover 32 again superimposed thereon. With the addition of the spring clips, the parts become tightly held and the peripheral seals around both of the filter media are restored.

Although various minor modifications may be suggested by those versed in the art, it should be understood that we wish to embody within the scope of the patent warranted hereon, all such embodiments as reasonably come within the scope of our contribution to the art.

I claim as my invention:

1. A power driven cleaning device for an aquarium tank having a rim, comprising:
   (a) a body adapted to be suspended in the tank on the rim of the tank, and including an impeller housing portion and a filter housing portion, for both extending into the tank;
   (b) a motor supported on said body above the rim;
   (c) an impeller rotatably supported in said impeller housing portion and having a drive connection with said motor;
   (d) said filter housing portion having a shallow rectangular nest open along its longer sides and flatwise receptive of a flat sheet of filter media;
   (e) a removable cover for fixedly holding said filter media in place, said cover being rectangular and having a flat marginal portion corresponding in length and width to said longer sides of said nest and disposed in said nest for engaging one side of the flat filter media at its periphery;
   (f) a plurality of spring clips embracing the edge portions of said cover and said filter housing portion;
   (g) means on said cover and said body defining a flow passage leading from a water inlet through said filter media, to said impeller, to a water outlet.

* * * * *